US006488116B2

(12) United States Patent
Bailey (10) Patent No.: US 6,488,116 B2
(45) Date of Patent: Dec. 3, 2002

(54) ACOUSTIC RECEIVER

(75) Inventor: Jeffrey R. Bailey, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 8 days.

(21) Appl. No.: 09/885,149

(22) Filed: Jun. 20, 2001

(65) Prior Publication Data

US 2002/0011378 A1 Jan. 31, 2002

Related U.S. Application Data

(60) Provisional application No. 60/212,982, filed on Jun. 21, 2000.

(51) Int. Cl.[7] .............................................. G01V 1/00
(52) U.S. Cl. ...................... 181/108; 181/112; 181/122
(58) Field of Search ................................. 181/108, 109, 181/110, 112, 122

(56) References Cited

U.S. PATENT DOCUMENTS

| 2,986,214 A | | 5/1961 | Wiseman, Jr. et al. ......... 166/55 |
| 3,118,501 A | | 1/1964 | Kenley ........................ 166/55.4 |
| 3,662,833 A | | 5/1972 | Kisling, III .................. 166/314 |
| 4,102,401 A | | 7/1978 | Erbstoesser .................. 166/284 |
| 4,113,314 A | | 9/1978 | Savanick et al. ............... 299/4 |
| 4,244,425 A | | 1/1981 | Erbstoesser et al. ......... 166/284 |
| 4,637,468 A | | 1/1987 | Derrick ........................ 166/297 |
| 4,671,352 A | | 6/1987 | Magee, Jr. et al. .......... 166/186 |
| 4,702,316 A | | 10/1987 | Chung et al. ................. 166/272 |
| 4,706,224 A | | 11/1987 | Alford ........................... 367/41 |
| 4,776,393 A | | 10/1988 | Forehand et al. ............ 166/55.1 |
| 4,809,781 A | | 3/1989 | Hoefner ....................... 166/273 |
| 5,060,751 A | * | 10/1991 | Kuhlman et al. ............. 181/102 |
| 5,172,480 A | | 12/1992 | Labuc et al. ................... 33/304 |
| 5,231,252 A | * | 7/1993 | Sansone ....................... 181/122 |
| 5,243,544 A | | 9/1993 | Schoess ....................... 364/566 |
| 5,309,995 A | | 5/1994 | Gonzalez et al. ............ 166/284 |
| 5,314,019 A | | 5/1994 | Honarpour ................... 166/270 |
| 5,353,875 A | | 10/1994 | Schultz et al. ............... 166/297 |
| 5,485,882 A | | 1/1996 | Bailey et al. ................. 166/284 |
| 5,503,225 A | | 4/1996 | Withers ...................... 166/250.1 |

(List continued on next page.)

FOREIGN PATENT DOCUMENTS

| EP | 0 082 524 | 6/1983 | ............ G01D/5/30 |
| GB | 2275337 | 8/1994 | ............ G01V/1/20 |

OTHER PUBLICATIONS

Pechstedt, R.D.; Webb, D.J.; an Jackson, D.A. "*Optical Fibre Accelerometers for High Temperature Applications*", SPIE—Fiber Optic and Laser Sensors XI, vol. 2070 (1993) pp. 352–359.

Davis, C.; Zarobila, C.; Rand, J.; and Lampman, R. "*Fiber–Optic Sensors for Geophysical Applications*", SPIE—Fiber Optic and Laser Sensors VI, vol. 985 (1988) pp. 26–32.

Li, Y.–G.; Leary, P.C.; and Henyey, T.L. "*Stress Orientation Inferred from Shear Wave Splitting in Basement Rock at Cajon Pass*", Geophysical Research Letter, vol. 15, No. 9, Paper No. 8L7356 (Aug. Supplement 1988) pp. 997–1000.

Engi, Dennis. *A Spherical–Stochastic Methodology for Microseismic Event Location*, Computers & Geosciences, vol. 15, No. 7, (1989) pp. 1037–1052.

(List continued on next page.)

Primary Examiner—Shih-Yung Hsieh
(74) Attorney, Agent, or Firm—Kelly A. Morgan (57) ABSTRACT

An acoustic receiver for sensing acoustic waves and generating orthogonal triaxial acoustic response data representative of said acoustic waves is disclosed. The receiver has at least four acoustic sensors oriented in at least four different directions. Each of the acoustic sensors is adapted to produce an electrical signal in response to an acoustic wave impinging thereon. The inventive acoustic receiver also includes means for combining the electrical signals to yield orthogonal triaxial acoustic response data. In one embodiment the means for combining the electrical signals comprises wiring the acoustic sensors in two series pairs to produce a combined output along two of the three orthogonal axes and orienting at least one acoustic sensor substantially parallel to the longitudinal axis of the acoustic receiver.

8 Claims, 5 Drawing Sheets

U.S. PATENT DOCUMENTS

| | | | |
|---|---|---|---|
| 5,513,703 A | 5/1996 | Mills et al. | 166/55.1 |
| 5,579,844 A | 12/1996 | Rebardi et al. | 166/296 |
| 5,803,178 A | 9/1998 | Cain | 166/306 |
| 5,865,252 A | 2/1999 | van Petegem et al. | 166/297 |
| 5,890,536 A | 4/1999 | Nierode | 166/284 |
| 5,934,377 A | 8/1999 | Savage | 166/281 |
| 5,954,133 A | 9/1999 | Ross | 166/297 |
| 5,996,687 A | 12/1999 | Pringle et al. | 166/66.6 |
| 6,186,230 B1 | 2/2001 | Nierode | 166/250.1 |
| 6,189,621 B1 | 2/2001 | Vail, III | 166/385 |
| 6,257,332 B1 | 7/2001 | Vidrine et al. | 166/250.15 |
| 6,296,066 B1 | 10/2001 | Terry et al. | 175/92 |

OTHER PUBLICATIONS

Mykkeltveit, S. and Bungum H. "*Processing of Regional Seismic Events using Data from Small–Aperture Arrays*", *Bulletin of the Seismological Society of America*, vol. 74, No. 6 (Dec. 1984) pp. 2313–2333.

Kirichenko, Oleg V.; Kulchin, Yuri N., Vitrik, Oleg B.; and Petrov, Yuri S. "*Fiber–Optic Sensors for Vibration Registration by means of Interferometry and Speckle–Interferometry Methods*", *SPIE—Fiber Optic and Laser Sensors XI*, vol. 2070, (1993) pp. 409–415.

Hartenberger, R.A. and Van Nostrand, R.G. "*Influence of Number and Spacing of Sensors on the Effectiveness of Seismic Arrays*", *32nd Meeting of the European Association of Exploration Geophysicists*, Edinburgh (May 1970) pp. 771–784.

Thorne, B.J. and Morris, H.E. *An Assessment of Borehole Seismic Fracture Diagnostics*, SPE 63rd Annual Technical Conference, Houston, TX, Paper No. 3, (Oct. 22–5 1988) pp. 123–131.

"*Assessment of Borehole Seismic Fracture*" *National Technical Information Service*, (1988) 11 pages.

Schmidt, M. and Goder, R. "*A Digitally–Controlled Broad–Band Seismometer*", *Gerlands Beitr. Gophysik*, Leipzig 98 (1989) 1, S. pp. 84–87.

* cited by examiner

ACOUSTIC RECEIVER

REFERENCE TO RELATED APPLICATION

This application claims the benefit of provisional patent application No. 60/212,982 filed Jun. 21, 2000.

FIELD OF THE INVENTION

This invention relates generally to the field of acoustic monitoring for seismic or microseismic purposes. More specifically, the present invention is an acoustic receiver for sensing acoustic waves propagating through subterranean formations and generating triaxial acoustic response data representative of the waves.

BACKGROUND OF THE INVENTION

In the production of hydrocarbons or the like from subterranean formations, it is common to hydraulically fracture a producing formation to increase the productivity from the formation. In a typical hydraulic fracturing operation, fluid is injected through the wellbore and into the formation at a high flow rate and at a pressure greater than the earth stress in the formation. This causes fractures to form in the formation, which fractures generally begin at the wellbore and radiate laterally away from the wellbore. It is desirable to know the length and direction (azimuth angle) of the fracture extending away from the well in order to predict with greater accuracy the influences of the fracture on the flow of fluids in the zone of interest. It is also important to determine the vertical extent of the hydraulic fracturing to determine if the fracture has grown to intersect other permeable zones above or below the zone of interest. As described further below, it is well known that an indication of hydraulic fracture direction, or azimuth angle, can be derived from microseismic events-also known as low energy acoustic emissions or waves in the earth-occurring when the hydraulic fracture is formed. impermeable barrier which bounds the intended injection zone can indicate such movement.

Microseismic events may also be produced in the subsurface by processes other than induced hydraulic fracturing of wells or pressure changes in a reservoir. For example, subsidence accompanying reservoir pressure reduction may lead to movement of piles or other equipment at the surface or seabed above a reservoir, producing additional microseismic events. Also, increase in pressure inside the casing of a well may cause mechanical failure of the cement sheath around the casing, and an acoustic wave may originate from very near the casing. If there is communication of fluid pressure along the wellbore outside the casing because of lack of a hydraulic seal by the cement, the pressure changes may cause microseismic events originating very near the casing. There may be a need to determine the location of these microseismic events or the magnitude of these events.

Furthermore, sources of acoustic waves in the subsurface are not limited to microseismic events. For example, a well flowing uncontrolled to the surface of the earth, called a "blowout", may flow at such high rates that significant acoustic noise is created at the bottom or at other segments of the well. There is often a need to locate the source of this noise in order to assist in attempts to stop the uncontrolled flow. Measurements of the source of the noise may be made from offset wells.

Wellbore acoustic receivers for detecting microseismic events or acoustic waves in a well have become widely available in recent years. An acoustic wave will travel away from the source with approximately spherical wave fronts consisting of a compressional "P"-wave phase and a shear "S"-wave phase, which can be used to determine the source location. Conventional acoustic receivers typically have three mutually orthogonal seismic sensors (geophones or accelerometers) for collecting three-component (i.e., x,y,z) data and include means for coupling the receivers to the casing of a well. The seismic signals received are transmitted to the surface of the earth by various means (e.g., conventional wireline) and are then processed to determine the seismic source location. Signals from acoustic receivers can be transmitted to the surface over wireline using frequency modulated telemetry signals. The multiple individual signals are recovered at the surface by bandpass filtering and converted to amplitude modulated signals. Alternatively, signals from the receivers may be digitized downhole and transmitted to the surface in real-time over a fiber optic cable or copper wire.

However, it may be difficult to obtain useable data from conventional acoustic receivers because microseismic events generated by induced hydraulic fractures or arising from other sources vary widely in amplitude. The amplitudes of events in the range of interest for microseismic monitoring may vary by four or more orders of magnitude as a result of source variability and attenuation due to source receiver separation. The dynamic range of the signals may exceed the dynamic range of the acoustic receiver. In addition to this signal amplitude problem, there are geometric considerations related to sensor placement which cause additional variability in the apparent signal strength of an acoustic emission detected by conventional acoustic receivers. The inventive device is designed to mitigate these geometry effects on signal reception.

Most acoustic receivers used for vertical seismic profiling tools consist of an orthogonal triaxial set of sensors, often geophones, with one sensor oriented along the wellbore axis and two orthogonal sensors in the orthogonal plane to record the full three-component (x-y-z) response vector. The strength of the acoustic sensor impulse reading will depend on the amplitude of the seismic event as well as the position of the seismic event relative to the acoustic receiver. If the angle between the axis of an acoustic sensor and the impinging acoustic energy is small, then the full event amplitude is applied to that acoustic sensor. However, if the angle is large, perhaps nearly 90°, then the applied signal strength along the axis of this sensor is significantly reduced. This amplitude level may be below the linear acoustic response threshold of the sensor. This geometric factor further adds to the difficult dynamic range problem that exists as a result of the source magnitude variability.

Accordingly, there is a need for an improved acoustic receiver design that has a more balanced response, without full dependence for waveform recording on a sensor that may be nearly orthogonal to the impinging acoustic wave motion. This would allow the response of the acoustic receiver to be subject to only the dynamic range variability of the seismic source without dependence on the geometric factors associated with position of the seismic event relative to the acoustic sensor.

SUMMARY OF THE INVENTION

The present invention is an acoustic receiver for sensing acoustic waves and generating orthogonal triaxial acoustic response data representative of the acoustic waves. The acoustic receiver of the present invention comprises at least four acoustic sensors oriented in at least four different directions. Each of the acoustic sensors is adapted to produce an electrical signal in response to an acoustic wave impinging on the sensors. The acoustic receiver further comprises a means for combining the electrical signals to yield orthogonal triaxial acoustic response data. In one embodiment, the acoustic receiver comprises at least five acoustic sensors oriented in at least five different directions: The acoustic sensors are wired in series pairs to produce a combined output along two of the three orthogonal axes, and one acoustic sensor is oriented substantially parallel to the longitudinal axis of the acoustic receiver. In another embodiment, at least one of the acoustic sensors is oriented substantially parallel to the longitudinal axis of the acoustic receiver and four of the acoustic sensors are angularly oriented at approximately 0°, 45°, 90°, and 135°, respectively, from a designated reference position. A method for sensing acoustic waves and generating orthogonal triaxial acoustic response data representative of the acoustic waves is also disclosed. The method comprises providing at least four acoustic sensors oriented in at least four different directions, with each of the acoustic sensors adapted to produce an electrical signal in response to an acoustic wave impinging thereon and combining said electrical signals to yield orthogonal triaxial acoustic response data.

BRIEF DESCRIPTION OF THE DRAWINGS

For a better understanding of the present invention, reference may be made to the accompanying drawings, in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which may be included within the spirit and scope of the invention, as defined by the appended claims.

DETAILED DESCRIPTION OF THE INVENTION

The present invention is an acoustic receiver for sensing acoustic waves and generating orthogonal triaxial acoustic response data representative of the acoustic waves. The acoustic receiver of the present invention comprises at least four acoustic sensors (such as geophones or accelerometers) oriented in at least four different directions. Each of the acoustic sensors is adapted to produce an electrical signal in response to an acoustic wave impinging on the sensor. Although the output of the sensor package is preferably "triaxial" in the sense that the measurements transmitted to the surface are the responses along three orthogonal coordinate directions, at least one additional sensor is used in the invention, versus typical receivers which use three orthogonal sensors. Accordingly, the sensor package of the inventive acoustic receiver no longer forms a strictly orthogonal triaxial set. The sensor outputs must be combined through an active or passive electronic network to yield the desired triaxial measurements.

The outputs of randomly-oriented sensors can be described mathematically as follows. An orthogonal set of "measurement" axes x, y, and z is assumed. $\vec{x}$, $\vec{y}$, and $\vec{z}$ are unit magnitude three-component direction vectors in three mutually orthogonal directions; $\vec{u}_j$ is a direction vector oriented in the direction of the $j^{th}$ acoustic sensor. Four or more sensors (n>4) are oriented along the direction vectors $\vec{u}_j$. The output time series response of the $j^{th}$ sensor is denoted by $s_j(t)$. The time series measurements x(t), y(t), and z(t) may be written as the summation of time series components along the respective axes of each sensor using the vector inner product. The response components must also be normalized by the sum of the projections of the sensor axes onto the output response axes. These relations may be written as follows:

$$x(t) = \frac{\sum_{j=1}^{n}(\vec{x}\cdot\vec{u}_j)s_j(t)}{\sum_{j=1}^{n}(\vec{x}\cdot\vec{u}_j)} \quad \text{(Equation 1)}$$

$$y(t) = \frac{\sum_{j=1}^{n}(\vec{y}\cdot\vec{u}_j)s_j(t)}{\sum_{j=1}^{n}(\vec{y}\cdot\vec{u}_j)} \quad \text{(Equation 2)}$$

$$z(t) = \frac{\sum_{j=1}^{n}(\vec{z}\cdot\vec{u}_j)s_j(t)}{\sum_{j=1}^{n}(\vec{z}\cdot\vec{u}_j)} \quad \text{(Equation 3)}$$

These equations illustrate that the acoustic energy output along any axis may be obtained by appropriate linear combination of the outputs of arbitrarily oriented sensors, weighted by appropriate trigonometric factors known to those skilled in the art. Multiple sensor combinations may be considered to facilitate constructive and destructive interference along specific coordinate directions. In a preferred embodiment, the acoustic sensors are wired in two series pairs to produce the combined output along each orthogonal axis, and one acoustic sensor is oriented substantially parallel to the longitudinal axis of the acoustic receiver. This eliminates the need for electronic gain and summation circuits to formulate the linear combinations.

Figure 1:
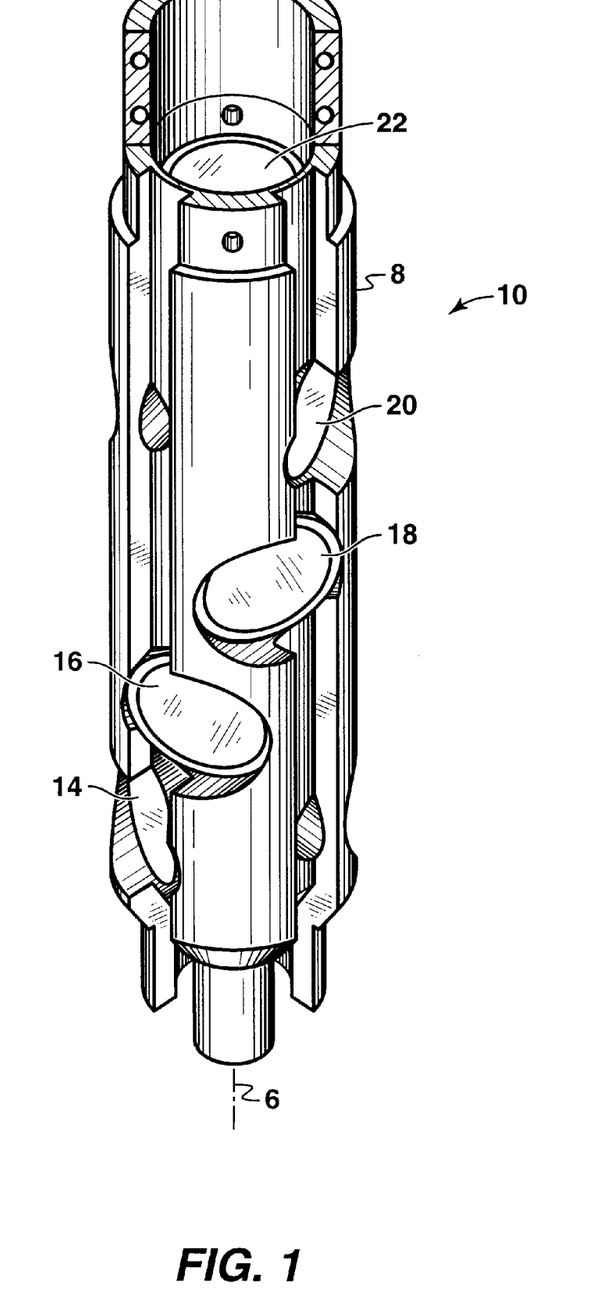
FIG. 1 illustrates one embodiment of the inventive acoustic receiver of the present invention.

FIG. 1 illustrates one embodiment of the inventive acoustic receiver 10 of the present invention. For purposes of this description, the acoustic receiver 10 is placed in the well (not shown) such that the longitudinal axis 6 of receiver 10 is substantially parallel to the longitudinal axis of the well. Acoustic receiver 10 includes a set of four sensors 14, 16, 18, and 20 (geophones or accelerometers) arranged in receiver housing 8. Sensors 14 and 16 are oriented at (+/−) 22.5° to the X-axis and sensors 18 and 20 are oriented at (+/−) 22.5° to the Y-axis. The X axis channel is found by wiring the sensors 14 and 16 in series, and the Y axis channel is obtained by wiring sensors 18 and 20 in series. The effect of series combination of the sensors is to cause constructive and destructive interference as described below. Acoustic receiver 10 also includes sensor 22 which measures the response amplitude along the longitudinal axis 6 of the acoustic receiver 10.

The X axis response to motion along the X-axis is the average of GX1 and GX2 with a gain of (cos (22.5°)+cos (−22.5°)=1.848), where GX1 is the response amplitude of sensor 16, GX2 is the response amplitude of sensor 14, and cos (+/−22.5) is the projection of the source vector onto the respective sensor axes. This is an example of constructive interference. Similarly, the X axis response to motion along the perpendicular Y-axis is the average of GX1 and GX2 with zero gain (sin (22.5°)+ sin (−22.5°)=0), illustrating destructive interference.

Alternatively, the outputs of the four cross-axis sensors in FIG. 1 could be combined electronically as in Equations 1–3 using geometric weights as follows:

$$X=[\cos(22.5°)*(GX1+GX2)+\sin(22.5°)*(GY1-GY2)]/1.848;\text{ and}$$

$$Y=[\cos(22.5°)*(GY1+GY2)+\sin(22.5°)*(GX1-GX2)]/1.848;$$

where GY1 is the response amplitude of sensor 18 and GY2 is the response amplitude of sensor 20. This combination via electronic circuits is feasible but not preferred for four sensors due to the additional cost and complexity. However, for a different number of sensors, or for randomly oriented sensors, the combination via electronic circuits may be preferred also using the methods of Equations 1–3.

Thus with the acoustic receiver of the present invention, the angular spacings of the sensors may be significantly less than 90° in order to improve the resolution of the azimuth angle measurements calculated from the data recorded. In one embodiment, for example, at least one of the acoustic sensors is oriented substantially parallel to the longitudinal axis of the acoustic receiver to detect vibrations along the wellbore axis and four of the acoustic sensors are angularly oriented at approximately 0°, 45°, 90°, and 135°, respectively, from a designated reference position. In this embodiment, the acoustic sensors oriented at 0° and 45° are wired in series to form the "x" channel, and the sensors oriented at 90° and 135° are wired in series to form the "y" channel. The common shared axis is the bisected angle of the individual sensor axes.

Field Test

Figure 2:
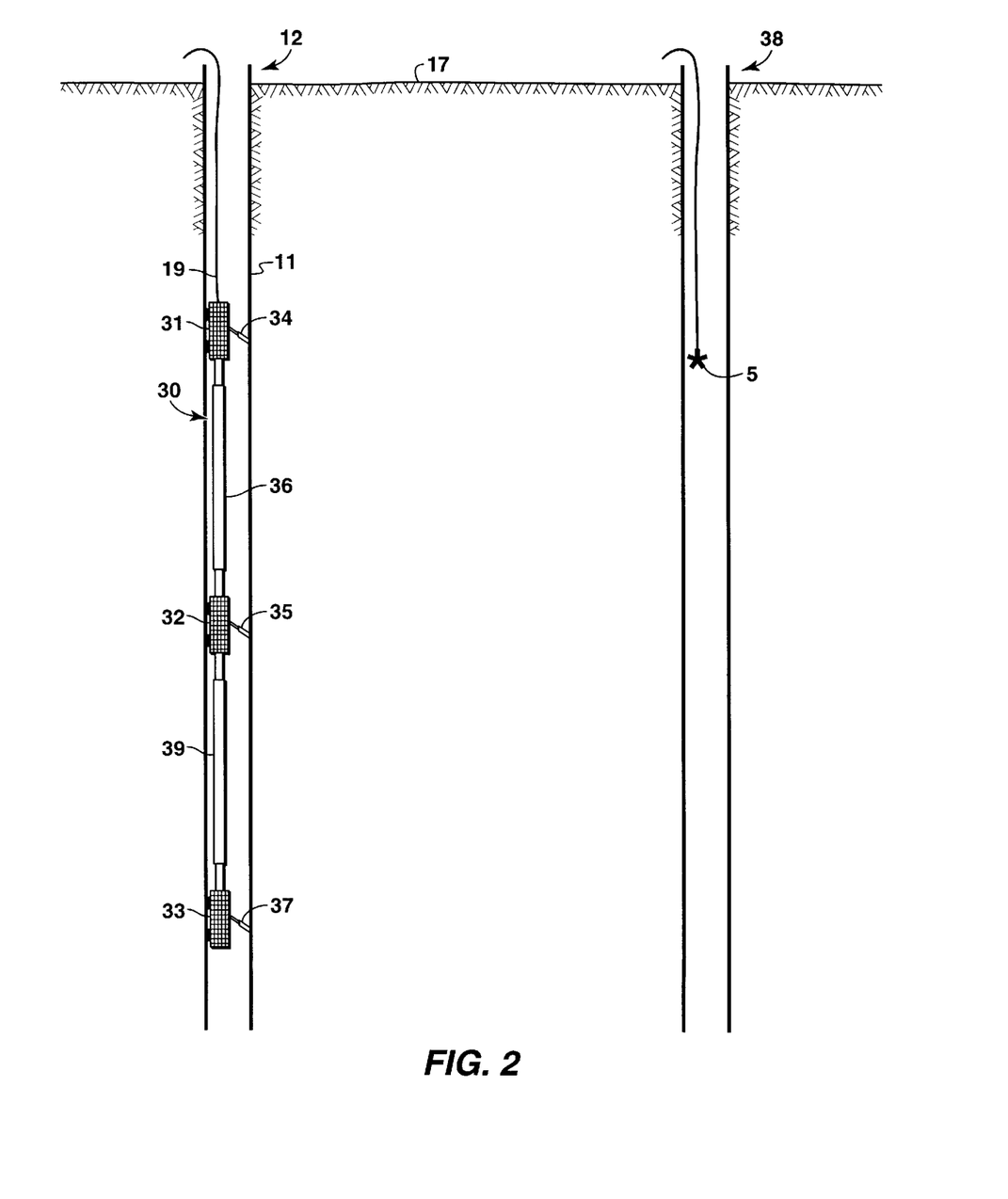
FIG. 2 illustrates the use of the inventive acoustic receiver in a well.

The performance of one embodiment of the inventive acoustic receiver was evaluated under controlled test conditions in a shallow test well. The data was recorded and transmitted to the surface using a "TABS" tool which is described in U.S. Pat. No. 5,747,750 and 5,917,160. Referring now to FIG. 2, a borehole seismic tool 30 was placed in well 12 at some point in casing 11 using wireline 19, which was a conventional seven-conductor electric wireline (but could be a fiber optic cable or copper wire for digital data transmission). The seismic tool 30 was equipped with three acoustic receivers 31, 32 and 33 and electronic data telemetry module 36 and gyro module 39. The data telemetry module 36 encodes the geophone amplitude response on multiple frequency-modulated data channels for transmission to the surface, and the gyro module 39 provides the orientation of the tool 30. Acoustic receiver 31 was configured with one conventional triaxial geophone sensor package, while acoustic receivers 32 and 33 were configured with one embodiment of the acoustic receiver of the present invention, as illustrated in FIG. 1. The seismic tool 30 was clamped to the wellbore 12 with clamps 34, 35, and 37 at depths from 200 to 700 feet below the surface 17 of the earth to record acoustic impulses generated in an offset well 38. The offset "source" well 38 was located approximately 250 feet away from "monitoring" well 12. Acoustic impulses 5 were generated by setting off 1 gram "cap" charges of dynamite at a depth of 200 ft in the source well 38.

Figure 3:
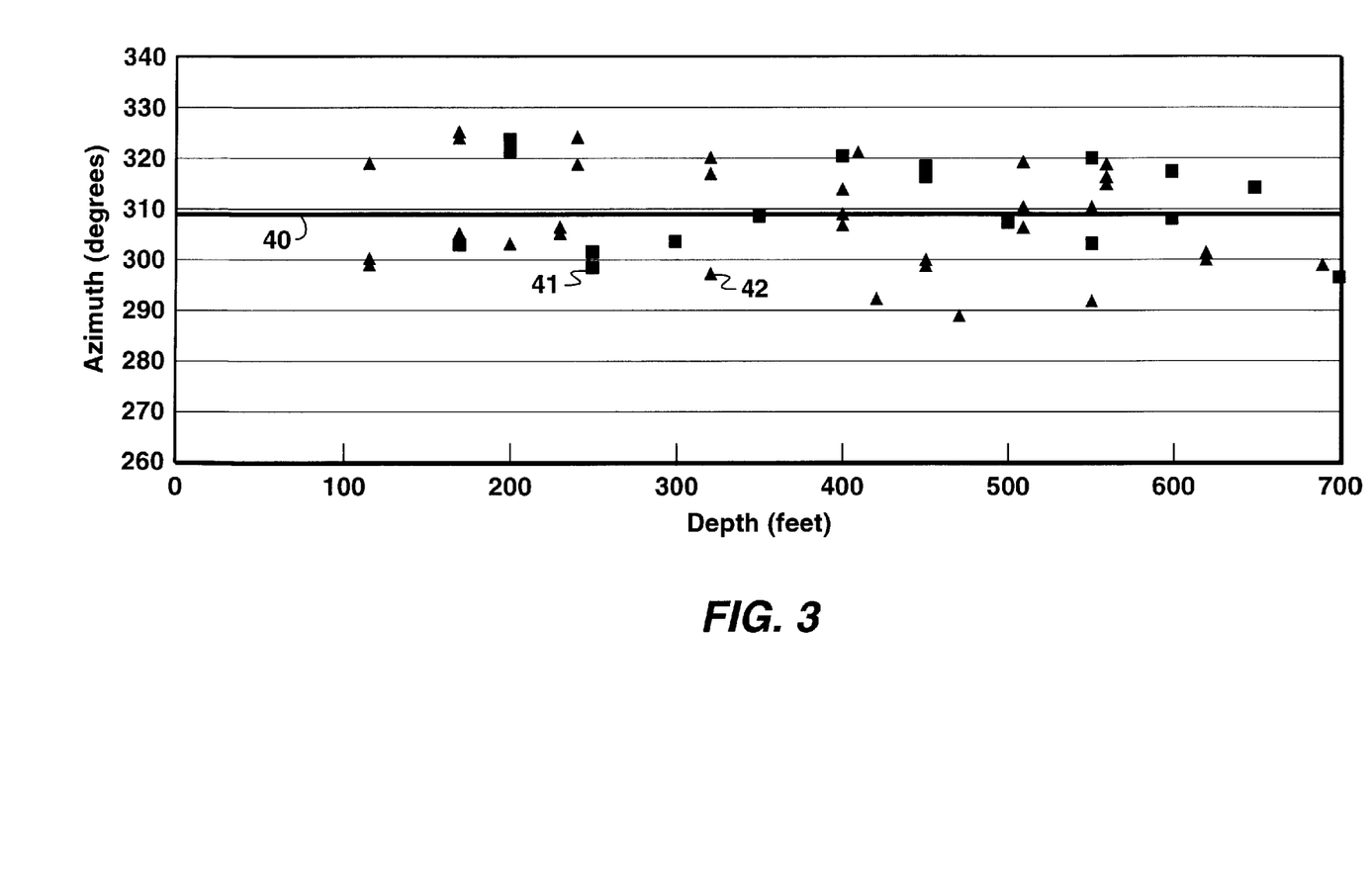
FIG. 3 is a plot of the calculated azimuth angle (degrees) versus depth (feet) for a tool having two inventive acoustic receivers (and a third conventional acoustic receiver for comparative purposes) and a tool having three conventional triaxial acoustic receivers.

The data recorded in the field test were evaluated to determine the calculated azimuth angle to the source well 38 from the monitoring well 12 using "hodogram" analysis, which are x-y crossplots with regression analysis to determine the best fit. The results as illustrated in FIGS. 3 through 6 show the superior response of a tool consisting of two inventive acoustic receivers in comparison to a tool with three conventional triaxial acoustic receivers. FIG. 3 is a plot of the calculated azimuth angle (degrees) versus depth (feet) for the respective tools. The surface measurement of the azimuth angle, represented by the solid line 40, was 309°. The "■" points (e.g., 41), represent the measurements recorded by the tool 30 with two inventive acoustic receivers, and the "▲" points (e.g., 42) represent the measurements from prior tests of a tool consisting of three conventional acoustic receivers. The calculated azimuth angle for the tool with two inventive acoustic receivers was 310.5° with a standard deviation of 8.5°, while the calculated azimuth angle for the tool with three conventional acoustic receivers was 307.8°, with a standard deviation of 10.5°.

Figure 4:
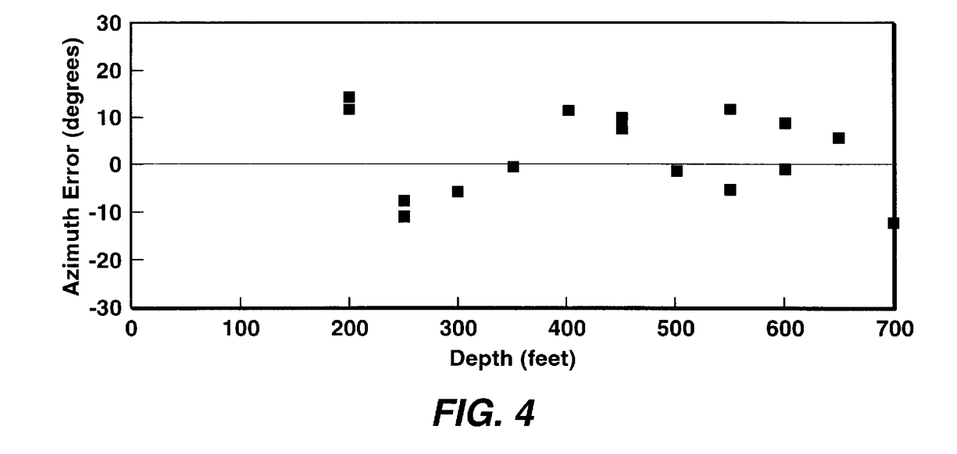
FIG. 4 is a plot of the calculated azimuth angle error (degrees) versus depth (feet) for the field test of the tool having two inventive acoustic receivers and one conventional acoustic receiver.
Figure 5:
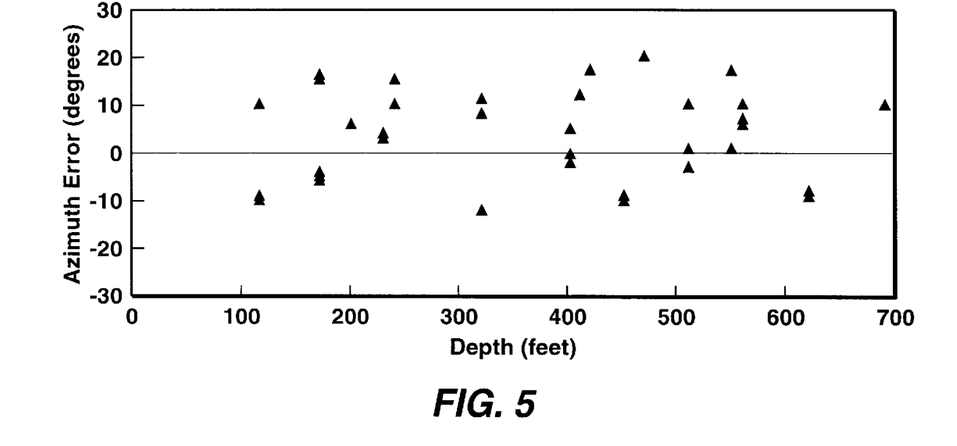
FIG. 5 is a plot of the azimuth angle error (degrees) versus depth of measurement (feet) for the tool having three conventional triaxial acoustic receivers.

FIG. 4 is a plot of the azimuth error (degrees) and the depth (feet) for the tool having two inventive acoustic receivers and one conventional acoustic receiver (for comparative purposes). FIG. 5 is a plot of the azimuth error (degrees) and the depth (feet) for the tool with three conventional triaxial acoustic receivers. The test data illustrated on these charts showed a reduction in the standard deviation of the data from 10.5° for the tool having three conventional acoustic receivers to 8.5° for the the tool having two inventive acoustic receivers. The maximum error for the test data is reduced from 20° for the tool having three conventional acoustic receivers to 14° for the tool having two inventive acoustic receivers. There is more scatter (less consistency) for the tool having three conventional acoustic receivers than for the tool having two inventive acoustic receivers.

Figure 6A:
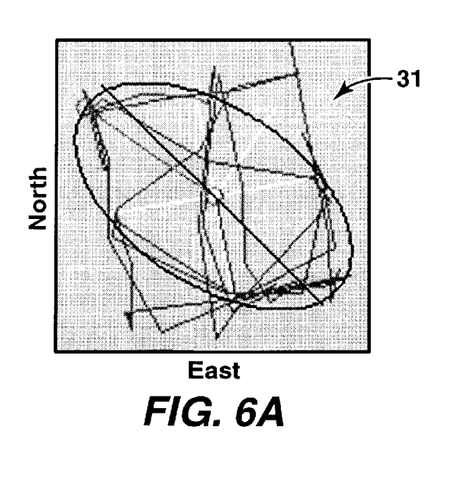
FIGS. 6A, B and C illustrate hodogram plots (i.e., x-y crossplots) of the field test results for the inventive acoustic receivers (FIGS. 6B and 6C) and the conventional acoustic receiver (FIG. 6A).
Figure 6B:
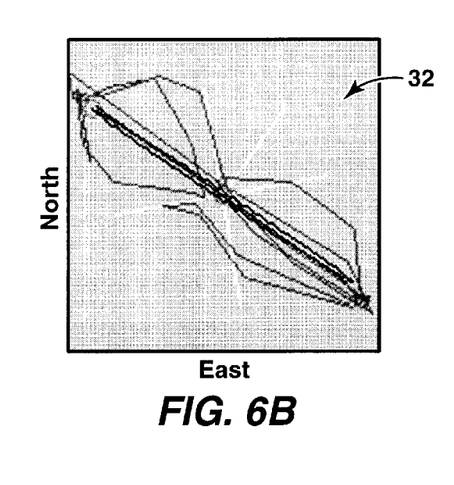
Figure 6C:
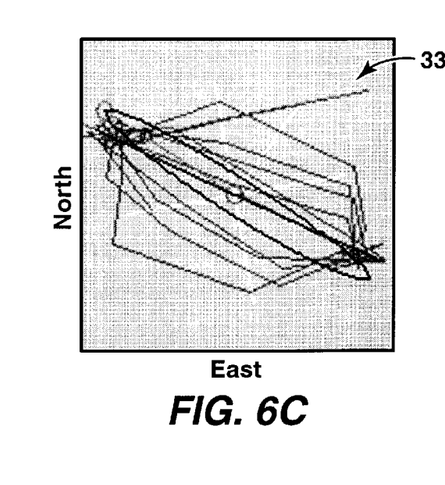

FIGS. 6A–6C shows the hodogram crossplot analysis (derived from the data obtained from tool 30 having one conventional acoustic receiver 31 and two inventive acoustic receivers 32 and 33) indicating the improvement in the data quality. A hodogram is a plot of the output of a geophone in one direction versus the output of the geophone in another direction, such as the x-direction versus the y-direction. As seen in the crossplots of FIG. 6, the results for the inventive acoustic receivers 32 and 33 are more elliptical in nature (FIGS. 6B and 6C) than the crossplot results for the conventional receiver 31 (FIG. 6A). The ellipses that have been fit to the data have both major and minor axes. The length of each is determined by the amplitude of the projections of the receiver data onto the axes, such that a smaller minor axis corresponds to less amplitude in the data along the orthogonal direction. Since the recorded data consists of P wave energy, the ellipses should be oriented towards the source direction and have a short minor axis.

The inventive device would also be useful in other geophysical applications in which data quality and sensor sensitivity are critical. Examples include four component time lapse seismic (4C/4D) which has been applied both on the surface and in the marine environment using ocean-bottom cables. Accurate recording of seismic data is an important consideration for such P and S wave surveys, particularly when there is limited control over certain variables (e.g., surface noise, wave action, noise induced by currents and geophone coupling).

It will be appreciated that while the present invention has been primarily described with regard to the foregoing embodiments, it should be understood that variations and modifications may be made in the embodiments described herein without departing from the broad inventive concept disclosed above or claimed hereafter.

I claim:

1. An acoustic receiver for sensing acoustic waves and generating orthogonal triaxial acoustic response data representative of said acoustic waves, said acoustic receiver comprising:

at least four acoustic sensors oriented in at least four different directions, each of said acoustic sensors adapted to produce an electrical signal in response to an acoustic wave impinging thereon; and means for combining said electrical signals to yield orthogonal triaxial acoustic response data.

2. The acoustic receiver of claim 1, wherein said acoustic receiver comprises at least five acoustic sensors oriented in at least five different directions and wherein said means for combining electrical signals comprises wiring said acoustic sensors in two series pairs to produce a combined output along two of the three orthogonal axes and wherein one acoustic sensor is oriented substantially parallel to the longitudinal axis of said acoustic receiver.

3. The acoustic receiver of claim 1, wherein said means for combining said electrical signals comprises electronic gain and summation circuits adapted to formulate said orthogonal triaxial acoustic response data according to the following equations:

$$x(t) = \frac{\sum_{j=1}^{n}(\vec{x}\cdot\vec{u}_j)s_j(t)}{\sum_{j=1}^{n}(\vec{x}\cdot\vec{u}_j)};$$

$$y(t) = \frac{\sum_{j=1}^{n}(\vec{y}\cdot\vec{u}_j)s_j(t)}{\sum_{j=1}^{n}(\vec{y}\cdot\vec{u}_j)}; \text{ and}$$

$$z(t) = \frac{\sum_{j=1}^{n}(\vec{z}\cdot\vec{u}_j)s_j(t)}{\sum_{j=1}^{n}(\vec{z}\cdot\vec{u}_j)},$$

where x(t), y(t), and z(t) are said orthogonal triaxial acoustic response data;

$\vec{x}$, $\vec{y}$, and $\vec{z}$ are unit magnitude direction vectors in three mutually orthogonal directions; $\vec{u}_j$ is a direction vector oriented in the direction of the $j^{th}$ acoustic sensor; $s_j(t)$ is the output time series response recorded by the $j^{th}$ acoustic sensor, n is the number of acoustic sensors, and $(\vec{x}\cdot\vec{u}_j)$, $(\vec{y}\cdot\vec{u}_j)$, and $(\vec{z}\cdot\vec{u}_j)$ represent vector inner products.

4. The acoustic receiver of claim 1, said acoustic receiver having a longitudinal axis, and wherein at least one acoustic sensor is oriented substantially parallel to said longitudinal axis of said receiver and the remaining acoustic sensors are oriented substantially perpendicular to said longitudinal axis.

5. The acoustic receiver of claim 1, said acoustic receiver having a longitudinal axis and wherein at least one of said acoustic sensors is oriented substantially parallel to said longitudinal axis of said receiver and four acoustic sensors are oriented substantially perpendicular to said longitudinal axis of said receiver, said four perpendicular acoustic sensors being angularly oriented at approximately 0°, 45°, 90°, and 135°, respectively, from a designated reference position.

6. A method for sensing acoustic waves and generating orthogonal triaxial acoustic response data representative of said acoustic waves comprising:

providing at least four acoustic sensors oriented in at least four different directions, each of said acoustic sensors adapted to produce an electrical signal in response to an acoustic wave impinging thereon;

and combining said electrical signals to yield orthogonal triaxial acoustic response data.

7. The method of claim 6 wherein at least five acoustic sensors are oriented in at least five different directions and wherein said electrical signals are combined by wiring said acoustic sensors in two series pairs to produce a combined output along two of the three orthogonal axes.

8. The method of claim 6, wherein said electrical signals are combined using comprises electronic gain and summation circuits adapted to formulate said orthogonal triaxial acoustic response data according to the following equations:

$$x(t) = \frac{\sum_{j=1}^{n}(\vec{x}\cdot\vec{u}_j)s_j(t)}{\sum_{j=1}^{n}(\vec{x}\cdot\vec{u}_j)};$$

$$y(t) = \frac{\sum_{j=1}^{n}(\vec{y}\cdot\vec{u}_j)s_j(t)}{\sum_{j=1}^{n}(\vec{y}\cdot\vec{u}_j)}; \text{ and}$$

$$z(t) = \frac{\sum_{j=1}^{n}(\vec{z}\cdot\vec{u}_j)s_j(t)}{\sum_{j=1}^{n}(\vec{z}\cdot\vec{u}_j)},$$

where x(t), y(t), and z(t) are said orthogonal triaxial acoustic response data; $\vec{x}$, $\vec{y}$, and $\vec{z}$ are unit magnitude direction vectors in three mutually orthogonal directions; $\vec{u}_j$ is a direction vector oriented in the direction of the $j^{th}$ acoustic sensor; $s_j(t)$ is the output time series response recorded by the $j^{th}$ acoustic sensor, n is the number of acoustic sensors, and $(\vec{x}\cdot\vec{u}_j)$, $(\vec{y}\cdot\vec{u}_j)$, and $(\vec{z}\cdot\vec{u}_j)$ represent vector inner products.

* * * * *